Figure 13:
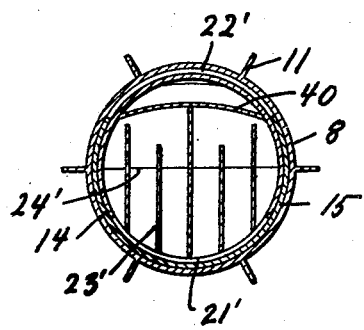

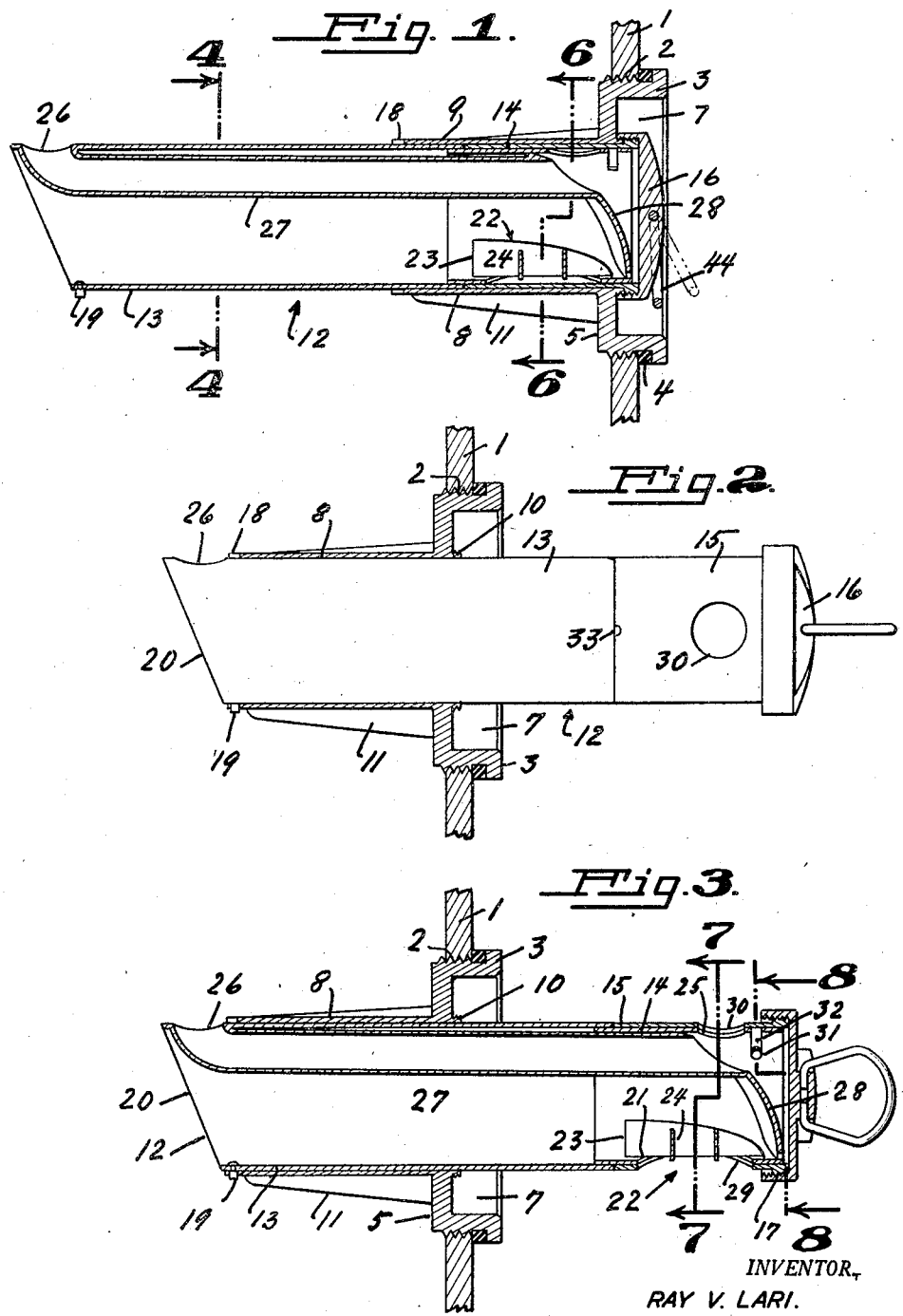

July 15, 1947.     R. V. LARI     2,424,101
VALVED, SLIDABLE DISCHARGE TUBE
Filed May 15, 1943     4 Sheets-Sheet 2
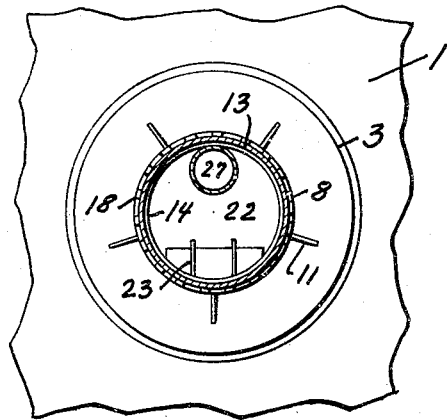
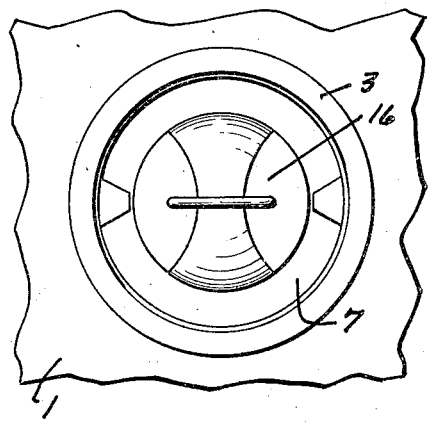
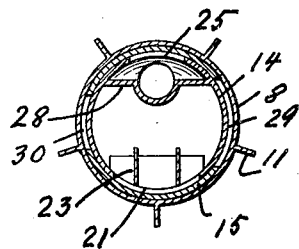
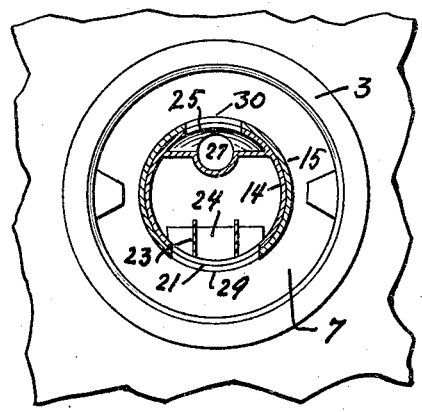
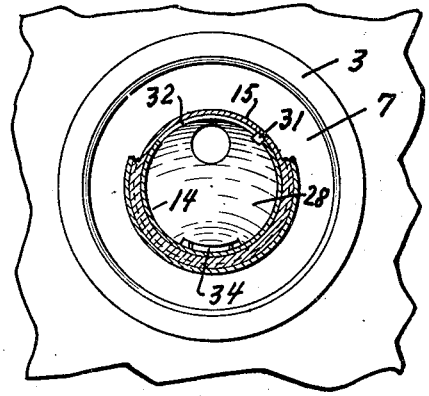
INVENTOR,
RAY V. LARI.
BY
*A. Schapp*
ATTORNEY.

July 15, 1947.  R. V. LARI  2,424,101
VALVED, SLIDABLE DISCHARGE TUBE
Filed May 15, 1943  4 Sheets-Sheet 3
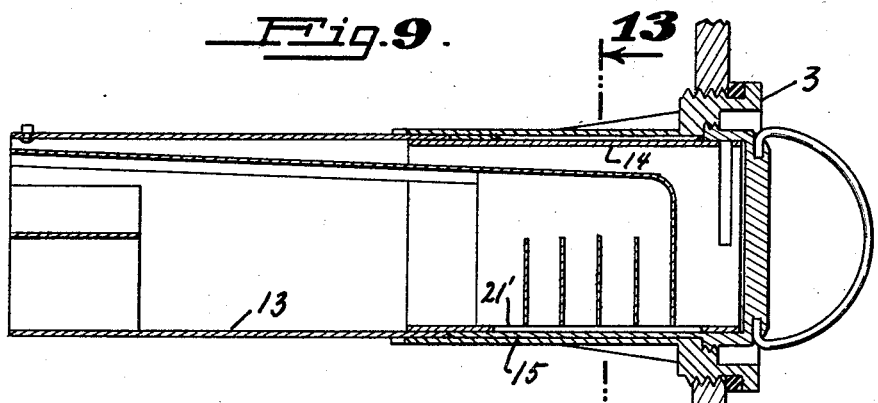
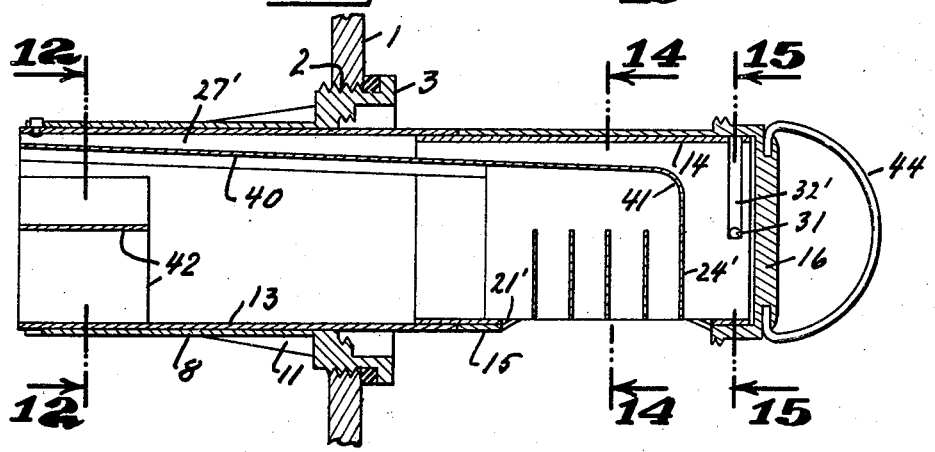
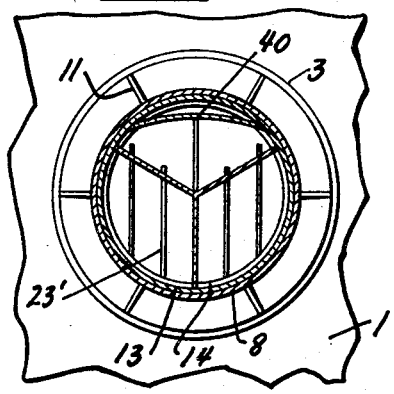
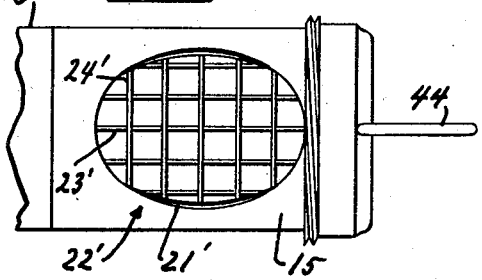
INVENTOR.
RAY V. LARI.
BY
A. Schapp
ATTORNEY.

July 15, 1947.  R. V. LARI  2,424,101

VALVED, SLIDABLE DISCHARGE TUBE

Filed May 15, 1943  4 Sheets-Sheet 4

INVENTOR.
RAY V. LARI.
BY
*A. Schapp*
ATTORNEY.

Patented July 15, 1947

2,424,101

UNITED STATES PATENT OFFICE 2,424,101

VALVED, SLIDABLE DISCHARGE TUBE

Ray Voir Lari, San Francisco, Calif.

Application May 15, 1943, Serial No. 487,114

12 Claims. (Cl. 222—519)

The present invention relates to improvements in dispensing valves, and has particular reference to valves adapted for use in connection with barrels containing liquid, particularly oil, gasoline, alcohol, and solvents of all types.

Barrels of this character, as used conventionally at the present time, are provided with three holes, namely, a dispensing hole in one end near the rim, a vent hole in the same end, usually diametrically opposite the dispensing hole, and a third hole in the cylindrical part of the barrel used for flushing operations. Each of these holes is closed by a suitable plug, and for dispensing operations, it is necessary to install a suitable faucet in the dispensing hole and to loosen or remove the plug in the vent hole.

In the present invention it is proposed to provide a self-venting valve, the use of which makes unnecessary the provision of a special vent hole with its plug and thus reduces the cost of manufacturing the barrel.

The elimination of the special vent hole has a number of advantages insofar as it prevents the escape of fumes, with its attendant fire hazard and evaporation losses, and limits oxidation of the liquid in the barrel because the atmosphere does not have free access to the liquid, and only so much air is admitted as is necessary to balance the amount of liquid withdrawn during each dispensing operation.

It is further proposed to arrange the self-venting valve in such a manner that the vent opens automatically with the valve and admits air somewhat less than is necessary to maintain atmospheric pressure above the liquid in the barrel. The partial vacuum thus present tends to limit explosion hazards in hot weather, and also has a tendency to prevent leaking through minute openings.

It is a further object of my invention to provide, in combination with the conventional plug, a retractable valve which will form a closure for the barrel when retracted and which may be projected outward to serve as a dispensing means at the dispensing place.

This feature has a number of advantages insofar as it saves time in handling, allows the valve to be installed by the manufacturer and to travel with the barrel, and avoids escape of fumes, oxidation and contamination of the liquid due to falling particles of dust or rust usually incident to the installation of a special faucet at the place of use.

Another object of my invention is to provide a baffle grid in the valve to insure a smooth and steady flow, free of spattering. This grid also aids the venting system, and, in some forms, may be relied on altogether for the venting.

And finally, I propose to provide a valve of the character described that is extremely simple in design, uses a straight conduit without any tortuous passages, and cuts off the supply of liquid with a sharp cutting action, so as to eliminate dripping.

Further objects and advantages of my invention will appear as the specification proceeds, and the novel features of my dispensing valve will be fully set forth in the claims hereto appended.

Figure 14:
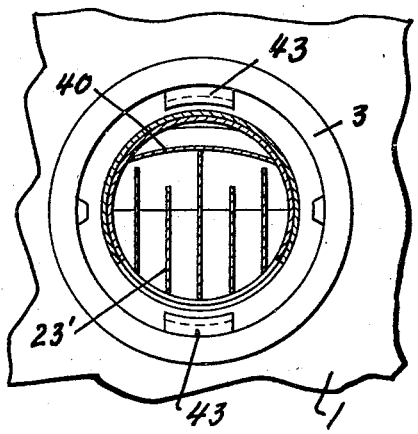

The preferred forms of my invention are illustrated in the accompanying drawings, forming part of this application, in which:

Figure 1 shows a longitudinal vertical section through my valve in retracted or barrel-closing position;

Figure 2, a side elevation of the valve in projected and closed position;

Figure 3, a longitudinal vertical section through the valve in projected and open position;

Figure 4, a cross-section taken along line 4—4 of Figure 3;

Figure 5, a front view of the valve in closed position;

Figure 6, a cross-section taken along line 6—6 of Figure 3;

Figure 7, a cross-section taken along line 7—7 of Figure 1;

Figure 8, a cross-section taken along line 8—8 of Figure 1;

Figure 9, a longitudinal vertical section through a modified form of my valve in retracted and closed position;

Figure 10, a similar section through the valve of Figure 9 in projected and open position;

Figure 11, a bottom plan view of the projecting portion of the valve;

Figure 12, a cross-section taken along line 12—12 of Figure 10;

Figure 13, a cross-section taken along line 13—13 of Figure 9;

Figure 14, a cross-section taken along line 14—14 of Figure 10; and

Figure 15:
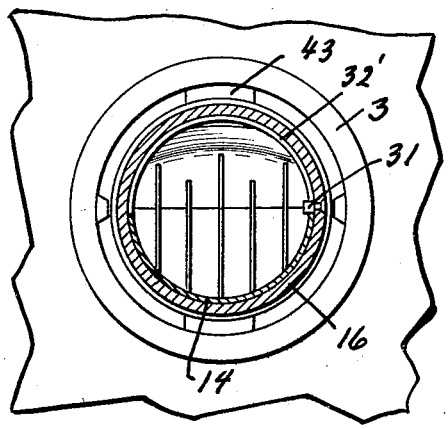

Figure 15, a cross section taken along line 15—15 of Figure 10.

While I have shown only the preferred forms of my invention, I wish to have it understood that various changes or modifications may be made within the scope of the claims hereto attached, without departing from the spirit of the invention.

Referring to the drawings in detail, and particularly to the form illustrated in Figures 1 to 8, inclusive, the wall of the barrel is indicated at 1 and is formed with a threaded aperture 2 for receiving the plug 3.

While the location of the aperture 2 is not especially shown, it will be understood that the aperture is preferably located in the conventional manner in one end of the barrel and near the periphery thereof to allow of the dispensing of substantially the entire liquid contents of the barrel.

The plug 3 is threaded into the aperture so as to come nearly flush with the outer face of the barrel wall and the fit is made leak-tight by means of a washer 4. The body portion 5 of the plug is set back with respect to its rim so as to form a cavity 7, and a tube 8 is supported centrally of the body portion, the tube projecting rearwardly through a considerable distance, as at 9, and forwardly through a very short distance, as at 10.

The forward projection is threaded externally, and the rearward projection is reinforced by a number of external vanes 11. This tube serves as a bearing member for the valve 12, which latter is slidable and revolvable in the bearing, unless locked against such movement by means to be described hereinafter.

The valve 12 is of the tubular type and comprises a sleeve 13 having a sliding fit in the bearing member and having a slightly reduced front section 14 on which is mounted, with freedom of revolving movement, a second sleeve 15 dimensioned to come flush in its outer surface with the body section of the first sleeve, so that it also has a sliding fit in the bearing or tube 8.

The outer end of the sleeve 15 has a cap 16 threaded thereon, as at 17, and the thread of the cap is slightly longer than that of the sleeve, so that, after the cap has been screwed home, a small portion of the thread will extend beyond the thread on the sleeve and may be used for threading upon the short forward projection of the tube 8, indicated at 10, when the valve is in retracted position.

The cap thus forms an independent solid closure for the hole in the plug, and it will be noted, particularly by reference to Figure 1, that in this position the cap is completely accommodated in the cavity 7 of the plug and that no part of the entire valve projects beyond the plug. This position is used while the barrel is in transit from manufacturer to consumer, and in this position, the valve does not in any way interfere with shipping and handling operations.

The rear end of the tube 8 is provided with an annular series of teeth 18, and the valve 12 has a pin 19 projecting from its rear end, the pin cooperating with the rear end of the tube 8 and the teeth in limiting the outward movement of the valve and in holding the same against turning movement when in end position.

The sleeve 13 of the valve 12 is straight throughout the length thereof and is preferably made of considerable diameter as compared with the size of the plug. It forms a straight fluid passage of sufficient size to take care of both the dispensing and venting features, and to insure, in combination with other structural elements, a smooth flow of the liquid in one direction and a return flow of air in the opposite direction, in such a manner that the return flow of air follows a different path from that of the outgoing liquid flow, and does not gurgle back through the latter while in the valve.

Although in my preferred form, I indicate the two different paths by means of a partition wall, it is a fact, nevertheless, that the separation of the return flow from the outgoing flow is inherent in the construction of the valve, and would take place regardless of any partition or division wall.

The rear end of valve section 13 is open, as indicated at 20, while the front end is closed by the cap 16. A large valve opening 21 is provided in the bottom of the projecting section 14 of the valve sleeve when the latter is adjusted to its proper position. Since the valve is revolvable in the plug, it is apparent, that the valve opening may be properly centered to be at the bottom regardless of the position occupied by the plug when screwed home and may be locked in that position by engagement of the pin 19 between the teeth 18.

Over the bottom opening there is provided a grid 22 comprising a plurality of longitudinal vanes 23 and transverse vanes 23 extending into the sleeve to a suitable height. This grid tends to arrest the longitudinal flow of the liquid, to break it up and to divert it downwardly in a smooth and steady flow.

Diametrically opposite the bottom opening 21, in the upper portion of the sleeve, there is provided a vent opening 25, of much smaller size than the discharge opening, and this vent opening is connected to a rear vent opening 26 in the valve sleeve by means of a vent tube 27 which runs along the upper portion of the valve sleeve and occupies a relatively small part of the latter in cross-sectional area. The front end of the vent tube is separated from the main discharge space of the valve sleeve by means of a partition 28 which is suitably curved to guide the downward flow of the liquid in a smooth curve.

The sleeve 15 is revolvable upon the front section of the sleeve 13 and is provided with two complementary openings 29 and 30, the opening 29 being of the same size as the discharge opening 21, and the opening 30 being of the same size as the vent opening 25. Since the vent openings are much smaller than the discharge openings, it is apparent that upon turning the outer sleeve from inactive to active position, the discharge opens before the vent opens and closes after the vent closes. This tends to create a partial vacuum above the liquid level in the barrel before the vent opens, and again after the vent closes, while again, due to the difference in sizes between the vent and the discharge passages, there is a tendency to maintain a partial vacuum during the entire dispensing operation.

The outer sleeve 15 is held against outward movement on the inner sleeve 14 by means of a pin 31 riding in a slot 32, the latter being of sufficient length to allow of an adequate amount of turning movement of the outer sleeve between valve opening and closing positions. The slot is preferably positioned in such a manner that at the end of turning movement in one direction, the valve is fully open, while at the end of a turning movement in the opposite direction, the valve is fully closed. Fully open position is indicated by the matching of two depressions 33.

The operation of my invention will be readily understood from the foregoing description. The valve forms a permanent part of the plug, and is preferably installed by the manufacturer. For shipping purposes, the valve is pushed inward and the cap 16 is screwed on the projecting flange 10 so as to form a complete closure for the barrel.

The cap is fully accommodated in the cavity 7 of the plug and there is no projecting part beyond the rim of the plug.

For dispensing operations, the cap is unscrewed from the flange 10 and is pulled outward, with the valve in closed position. The sleeve 13 is properly positioned with the aid of the depression 33 and is held in this position by the pin 19 engaging between the proper teeth 18, which brings the valve into the position of Figure 2. The outward sleeve is now turned through a quarter of a revolution to the position of Figure 3, and the liquid will flow through the main passage of the valve and the openings 21 and 29, while air will flow inward to partially relieve the vacuum above the liquid level through the vent openings 25—30 and the tube 27.

The grid 22 will cause a smooth flow of the liquid in the absence of any sputtering, and the relative differences in size between the discharge and vent passages will cause a partial vacuum to be created and maintained above the liquid level in the barrel which counteracts any tendency of the liquid to escape through any minute leakages that may develop around the plug or around the valve.

With a valve of this character no special vent hole is required. This has the advantage that no fumes formed above the liquid level in the barrel may escape, that no outside air enters directly into the space above the liquid level and that the air entering through the vent is just barely sufficient to compensate for the amount of liquid withdrawn during each dispensing operation, and somewhat less than required to maintain atmospheric pressure above the liquid. Since the valve is installed originally by the manufacturer, it is unnecessary to insert a valve at the point of use, with the attendant risk of fire, escape of fumes, and introduction of foreign matter and impurities.

The form of my invention illustrated in Figures 9–15, inclusive, differs from the first form in various respects. In this valve it is proposed to omit the vent hole in the top and to use the bottom hole for both dispensing and venting.

For this purpose the entire valve is made of a somewhat larger diameter than the one previously described, as compared with the size of the plug. The valve sleeve 13 has a reduced extension 14 on which the outer valve sleeve 15 is revolvable as previously described. The extension 14 is formed with a single discharge hole 21', the outer portion of which (near the cap) serves as a vent hole. The discharge hole is somewhat larger than in the form previously described, and the grid 22' is also made somewhat larger and contains more longitudinal and transverse vanes 23' and 24', which extend into the sleeve more deeply.

The vent passage 27' is formed by a longitudinal partition 40, crescent-shaped in cross-section, which begins at the inner end of the sleeve and extends forwardly along the upper portion of the sleeve along a taper to finally turn downward and to join the last transverse vane, as at 41.

This partition thus forms a vent passage extending from the outer portion of the discharge hole along the upper wall to the inner end of the valve sleeve, the passage decreasing in cross-section from the outer to the inner end of the valve. The inner end of the valve is also formed with a series of radial vanes or blades 42.

In operation, the liquid, after passing the radial vanes in the rear of the tube, is impeded in its advance by the grid and is diverted by the latter to pass through the discharge in a smooth and steady flow. The last transverse vane 24' arrests the forward flow altogether and allows the extreme end of the discharge hole to be used for venting.

It should be understood, however, that the division of the total valve area into a lower dispensing passage and an upper venting passage is due, not so much to the partition 40, but principally to the presence of the grid and the general construction of the valve with its larger diameter, its straight and unobstructed form and the large discharge opening.

Thus, substantially the same operation would take place if the partition 40 were omitted altogether. It is the grid which impedes the progress in a longitudinal direction of the liquid and diverts the same to discharge through the near portion of the discharge, thus naturally leaving the far portion unoccupied and reserving the same for venting purposes.

In other respects, the modified valve is similar to the one previously described, with some minor exceptions such as that the cap screws with a pair of lugs 43, and that the outer sleeve is free to turn through a full half revolution due to the length of the slot 32'. In each case the cap may be manipulated by a swinging handle 44.

If a few drops of liquid should find the way into the vent passage, they will freely discharge through the large opening 21' in the form of my invention illustrated in Figures 9 to 15, inclusive; while in the form shown in Figures 1 to 8, inclusive, they will pass to the main outlet through a narrow drain slot 34 provided in the bottom of the partition 28, as shown in Figure 8.

The form illustrated in Figures 9–15, inclusive, lends itself to use in connection with both vented and unvented barrels. If the barrel happens to have conventional venting means and it is desired to use the same, the vent passage of the valve will become a discharge passage and will add to the area of the main discharge for increasing the flow of the liquid. Both passages will deliver the liquid into the same receptacle in a smooth and non-sputtering flow.

I claim:

1. In combination, a plug for a container hole having a bearing therein, a sleeve slidable in the bearing, the sleeve being open at its inner end and having a discharge opening near its outer end, a grid within the sleeve over the discharge opening, and a valve member revolvable upon its outer end and having a port adapted for movement into and out of registry with the discharge opening.

2. In a discharge valve for a container, a bearing member in the wall of the container, a sleeve horizontally supported therein with its inner end open to the container and its outer end outside the container, the sleeve having a downwardly presented discharge opening in its outer end and having a vent passage along its upper wall, and a valve member revolvable on the outer end of the sleeve having ports adapted for registry with the discharge opening and the vent.

3. In a discharge valve for a container, a bearing member in the wall of the container, a sleeve horizontally supported therein with its inner end open to the container and its outer end outside the container, the sleeve having a downwardly presented discharge opening in its outer end and having a vent passage along its upper wall, and a valve member revolvable on the outer end of the sleeve having ports adapted for registry with the discharge opening and the vent, the discharge port being wider than the vent port so as to be opened before and closed after the latter when the valve member is turned into and out of registry.

4. In a dispensing device, a recessed closure plug for closing a bung opening of a container, a housing secured to the plug and terminating in the recess thereof at one end thereof and having its other end arranged within the container, a dispensing sleeve rotatably and slidably mounted in said housing and normally confined therein and provided with a dispensing port adjacent one end capable of being moved exteriorly of the housing and recess of the plug, a control sleeve rotatable on said dispensing sleeve for opening and closing said port and secured to said dispensing sleeve for a limited rotation and against endwise movement thereon.

5. In a dispensing device, a recessed closure plug for closing a bung opening of a container, a housing secured to the plug and terminating in the recess thereof at one end thereof and having its other end arranged within the container, a dispensing sleeve rotatably and slidably mounted in said housing and normally confined therein and provided with a dispensing port adjacent one end capable of being moved exteriorly of the housing and recess of the plug, a control sleeve rotatable on said dispensing sleeve for opening and closing said port and secured to said dispensing sleeve for a limited rotation and against endwise movement thereon, said housing within the recess of the plug having screw threads, an internally threaded closure cap secured to the control sleeve for threading onto and off of the housing, a pivoted finger ring carried by said cap, and a vent tube located in the dispensing sleeve and having one end extending therethrough adjacent the inner end of said dispensing sleeve and its opposite end extending therethrough opposite said port, said control sleeve having a vent opening for opening and closing the vent tube and adapted to open the latter on the opening of the port of the dispensing sleeve.

6. In a valve structure, a supporting member, and a straight tube carried by the member with freedom of movement between retracted and projecting positions and having a discharge hole near the outer end thereof, and a sleeve revolvable on said outer end and having a hole adapted for registry with the discharge hole, the sleeve having the same outside diameter as the tube so as to be retractible within the member and having a cap at the end thereof, and cooperable means between the cap and the member for securing the former upon the latter when the tube is in retracted position.

7. In a valve structure, a supporting member, a straight tube carried by the member with freedom of movement between retracted and projecting positions and having a discharge hole in the outer end thereof, a vent passage in said tube, and a sleeve revolvable upon the outer end of the tube and apertured for opening the discharge hole and the vent passage.

8. In a valve structure, a supporting member, a straight tube carried by the member with freedom of movement between retracted and projecting positions and having a discharge hole in the outer end thereof, a vent passage in said tube, and a sleeve revolvable upon the outer end of the tube and apertured for opening the discharge hole and the vent passage, the sleeve having a cap thereon, and the cap and the member having cooperating means for securing the cap upon the member.

9. In a valve of the character described, a tube having a discharge hole near one end thereof, a series of transverse baffles over the hole to smoothen flow of liquid therethrough, and a longitudinal partition extending in substantially horizontal position through the length of the tube and connected to one of the vanes so as to form a separate vent passage therewith.

10. In a valve of the character described, a straight horizontally disposed tube having a bottom discharge hole near one end thereof and having a vent opening opposite the hole, a longitudinal vent passage in the upper portion of the tube communicating with the vent opening, and a transverse partition at the outer end of the vent tube and extending downwardly to a point beyond the discharge hole for guiding liquid toward the discharge hole.

11. In a valve of the character described, a straight horizontally disposed tube having a bottom discharge hole near one end thereof and having a vent opening opposite the hole, a longitudinal vent passage in the upper portion of the tube communicating with the vent opening, and a transverse partition at the outer end of the vent tube and extending downwardly to a point beyond the discharge hole for guiding liquid toward the discharge hole, the partition having a drain opening for guiding liquid from the vent passage to the discharge hole.

12. In a valve structure of the character described, a plug for a container hole having a depressed bottom disposed within the confines of the container, a bearing in the bottom made to extend forwardly of the bottom a slight distance, and a valve tube slidable in the bearing and having a cap thereon, the cap having means cooperable with the forward extension of the bearing for securing the tube upon the bearing, and the cap and the bearing extension being dimensioned for accommodation of the cap within the confines of the plug.

RAY VOIR LARI.

REFERENCES CITED

The following references are of record in the file of this patent:

UNITED STATES PATENTS

| Number | Name | Date |
|---|---|---|
| 1,859,126 | Boeuf | May 17, 1932 |
| 1,164,144 | Tamagne | Dec. 14, 1915 |
| 657,274 | Ritz | Sept. 4, 1900 |
| 1,924,057 | Draper | Aug. 22, 1933 |
| 2,125,102 | Cornelius | July 26, 1938 |
| 1,891,315 | Norbo | Dec. 20, 1932 |
| 2,310,599 | Roach | Feb. 9, 1943 |
| 551,909 | Sprague | Dec. 24, 1895 |
| 1,471,868 | Swartz | Oct. 23, 1923 |
| 1,912,304 | Phillips | May 30, 1933 |
| 807,285 | Ketelsen | Dec. 12, 1905 |
| 1,894,064 | Schubenel | Jan. 10, 1933 |

FOREIGN PATENTS

| Number | Country | Date |
|---|---|---|
| 701,251 | France | Jan. 7, 1931 |
| 210,136 | Germany | May 22, 1909 |
| 13,394 | Great Britain | June 10, 1913 |